United States Patent
Grub et al.

[11] Patent Number: 5,101,091
[45] Date of Patent: Mar. 31, 1992

[54] ARRANGEMENT FOR THE GUIDANCE OF A BEAM DURING THE TREATMENT OF A WORKPIECE WITH A LASER

[75] Inventors: Robert Grub, Rothenbach; Bernd Warm, Nuremberg; Friedrich Lindner, Lauf, all of Fed. Rep. of Germany

[73] Assignee: Diehl GmbH & Co., Fed. Rep. of Germany

[21] Appl. No.: 508,790

[22] Filed: Apr. 12, 1990

[30] Foreign Application Priority Data

May 19, 1989 [DE] Fed. Rep. of Germany ....... 3916264

[51] Int. Cl.$^5$ .............................. B23K 26/06
[52] U.S. Cl. ................... 219/121.74; 219/121.83; 359/846
[58] Field of Search ............. 219/121.73, 121.74, 219/121.78, 121.83, 121.79, 121.8, 121.82; 350/607–609

[56] References Cited

U.S. PATENT DOCUMENTS

| | | | |
|---|---|---|---|
| 3,986,767 | 10/1976 | Rexer et al. ...................... | 219/121.6 |
| 4,396,285 | 8/1983 | Presta et al. ...................... | 356/138 |
| 4,451,299 | 5/1984 | Smeggil et al. ............ | 219/121.85 X |
| 4,734,557 | 3/1988 | Alfille et al. ..................... | 219/121.74 |

FOREIGN PATENT DOCUMENTS

| | | |
|---|---|---|
| 2009532 | 9/1970 | Fed. Rep. of Germany . |
| 3509582 | 2/1986 | Fed. Rep. of Germany . |
| 2162713A | 2/1986 | United Kingdom . |
| 2178619B | 2/1987 | United Kingdom . |

OTHER PUBLICATIONS

"Lasertechnologie" by C. Schmitz-Justen, p. 25.
Optoelektronik Magazin, vol. 4, No. 5, 1988, middle of p. 482.
"Aktive and Adaptive Optik in der Astronomie", Phys. Bl. 44, (1988) Nr. 12.

Primary Examiner—C. L. Albritton
Attorney, Agent, or Firm—Scully, Scott, Murphy & Presser

[57] ABSTRACT

An arrangement for the guidance or conductance of a beam during the treatment of a workpiece with a laser, especially during a surface treatment by the laser beam, through the intermediary of mirrors which are interposed in the path of the beam intermediate a laser source and the workpiece. At least one deflecting mirror of the mirrors is equipped with adjusting elements for implementing a locally variable topography of its mirror surface, and is actuated from a control apparatus for effectuating a deformation or distortion of the cross-sectional geometry of the beam in conformance with the measure of a specified geometry of the beam focal point on the surface of the workpiece.

5 Claims, 1 Drawing Sheet

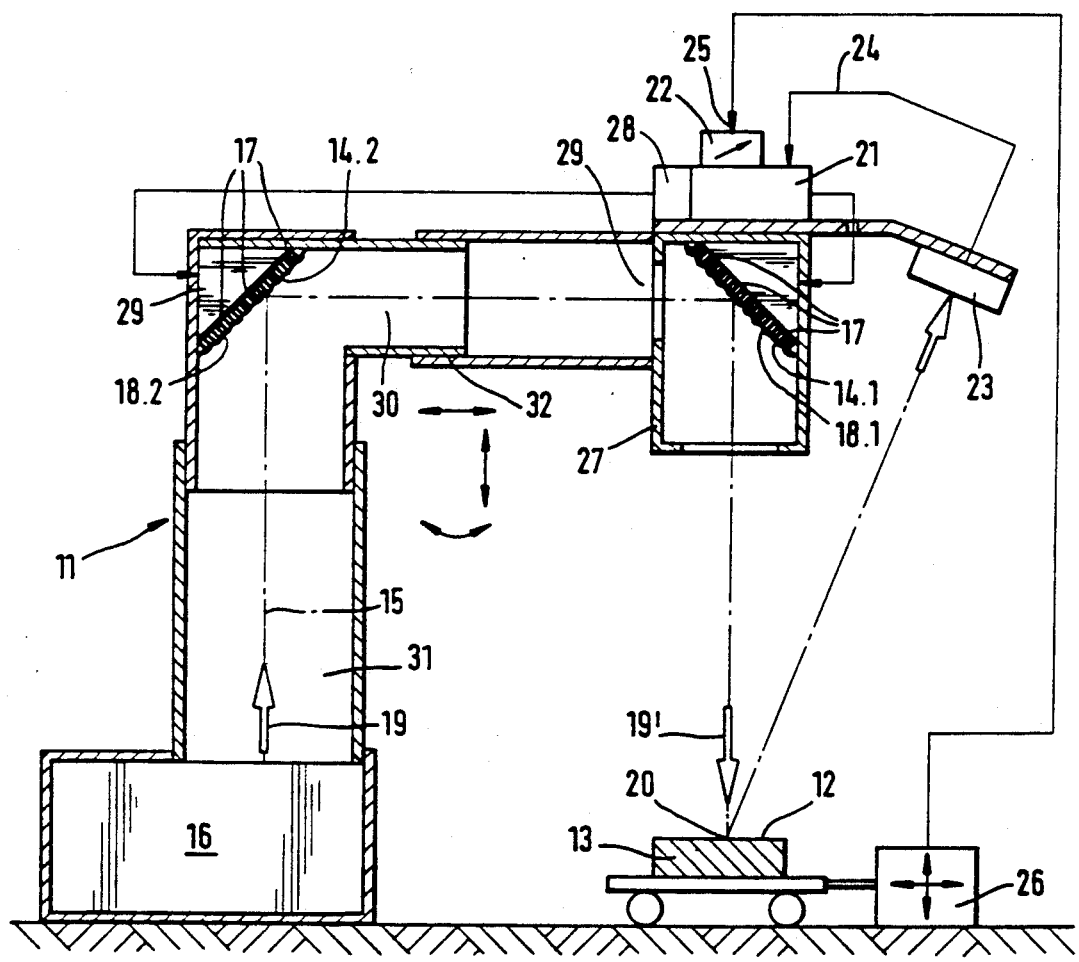

ARRANGEMENT FOR THE GUIDANCE OF A BEAM DURING THE TREATMENT OF A WORKPIECE WITH A LASER

BACKGROUND OF THE INVENTION

1. Field of the Invention

The present invention relates to an arrangement for the guidance or conductance of a beam during the treatment of a workpiece with a laser, especially during a surface treatment by the laser beam, through the intermediary of mirrors which are interposed in the path of the beam intermediate a laser source and the workpiece.

2. Discussion of the Prior Art

An arrangement of that type is known, in the constructional configuration of a so-called manipulable focusing optic, from the disclosure of U.S. Pat. No. 3,986,767. In particular, the present invention relates to an arrangement for surface treatments through the utilization of lasers; for example, such as have already become known from the disclosures of German Patent 35 09 582 or U.S. Pat. No. 4,451,299. With respect to the surface treatment of a workpiece, in which the treatment is based on a localized heating, there are encountered technological problems which are in general similar to those encountered during the autogenous welding to the extent that, in the direction of forward displacement along the treatment front, due to the heat conductivity of the material there is desired the presence of an excessive supplying of heat for effectuating the rapid heating up to the metallurgically required temperature, while in order to avoid any undesired reactions during the cooling down of the material (along the rear side with respect to the advancing movement during treatment), it is intended to obtain a delayed and within certain bounds controlled temperature dropoff, such as would be controllable through localized reduction in the supply of energy. In connection with the foregoing, reference is made to the laser power distribution and period of effectiveness which is sought after with respect to the specified process, as treated in the article "Laseranwendungen in der Fertigungstechnik", by C. Schmitz-Justen et al., in the publication "Lasertechnologie", page 25; and also referring to the middle of page 482 in OPTOELEKTRONIK MAGAZIN, Vol. 4, No. 5, 1988. In essence, it would not be ideal to allow the beam cross-section which is delivered from the laser source to directly act on the surface of the workpiece, inasmuch as within the present context, this would not occasion the formation of a desirable temperature profile in dependence upon the conditions of advancing movement along the treatment zone. In addition thereto, high-energy laser sources, such as are employed for a highly effective workpiece treatment, operate with astable resonators; in effect, which couple out or neutralize a ring-shaped beam cross-section. However, the movement of a ring-shaped beam image across the surface of the workpiece would lead to the situation that along the side edges of the path of treatment, because of the tangential overlapping, there would be encountered excessively high temperatures whereas inbetween thereof, due to the distance between the front-sided and rear-sides arcuate portion of the ring, there would then reign a lower temperature. This would be considerably remote from the intended temperature distributions, as has been qualitatively discussed hereinabove. In effect, for the high-energy laser technology there is known the applications of faceted mirrors for exerting an influence over individual beam cross-sections in relationship with adjacent beam portions (for example, offered for sale as VA-Mo-segmented mirror by the NIPPON Mining Co., Ltd.); however, the intended random correlatability of the energy focus or focal point to the actual reaction of the workpiece surface cannot be achieved through such fixed geometric beam tasks.

SUMMARY OF THE INVENTION

In recognition of the foregoing conditions, it is accordingly an object of the present invention to provide an arrangement of the above-mentioned type such that, notwithstanding the coupling out or neutralizing of a ring-shaped beam from the high-energy laser cavity, there can be attained a beam which is focusable against the surface of the workpiece with a beam focal point which is deformable or distortable dependent upon the direction of the treatment in correlation with the thermal demands for an individually specifiable energy distribution.

The foregoing object is inventively attained in that the arrangement of the type considered herein is constructed such that at least one deflecting mirror is equipped with adjusting elements for implementing a locally variable topography of its mirror surface, and which is actuated from a control apparatus for effectuating a deformation or distortion of the cross-sectional geometry of the beam in conformance with the measure of a specified geometry of the beam focal point on the surface of the workpiece.

Pursuant to the foregoing object there are employed techniques which have already currently available and which have found application in the high-energy laser technology as so-called adaptive optics; for example, as the so-called MDA (Multi-Dither-Actuator) mirror, as is disclosed in British Laid-Open Patent Appln. 2,162,713. In accordance with the foregoing, individual part regions of the mirror surface are offset or displaced relative to each other by fractions of the laser beam-wavelength out of the ideal mirror geometry (which can be a flat plane or can concavely extend in the center for focusing) so as to influence by means of phase displacements or shifts the resulting wave front of the laser beam, and thereby the energy distribution in the cross-section of the laser focal point on the surface of the technological demands. As a result thereof, not only can the ring-shaped beam cross-section in the laser focal point lead to a solid image, but the solid image can be distorted; for example, in the direction of the relative movement of the workpiece, and be imparted a higher beam intensity in the direction of movement than in the opposite direction of the laser focal point. From the viewpoint of apparatus, this represents a simpler and more easily controllable solution than; for instance, the targeted superposition of separate laser beams, such as is known from the disclosure of U.S. Pat. No. 4,396,285.

The localized deformation of the mirror surface regions is expediently carried out through piezo-adjusting elements arranged behind thereof, which are imparted a stable and reproducible deflection by means of a control circuit of the type as is described in closer detail in British Laid-Open Patent Appln. 2,178,619; the disclosure of which is incorporated herein by reference. For the compensation of mechanical and electrical drift phenomena, inclusive the effects of ambient or environmental temperature fluctuations, there is expediently introduced a mechanical-electrical balance. When there is to be ensured the formation of a defined beam focal point on the surface of the workpiece in conformance with the measure of a specified task, then there is expediently inserted an image receiver for the obtention of the actual value for a closed control circuit. The individual part regions of the focal point, corresponding to the individual crosssectional areas of the deformed laser beam, are hereby individualized in accordance with the MDA principle through the adjusting strokes of high-frequencied superimposed modulating deflections. In order to be able to avoid electrical and mechanical interference couplings, and to allow for high amplitudes and also for the modulation as well as for the deformation adjusting strokes, in contrast with the conditions encountered pursuant to the British Laid-Open Patent Appln. 2,162,713, it is always expedient not to utilize a single mirror for the modulation as well as for the adjusting magnitudes for the deformation, and to construct separate mirrors with deformable mirror surfaces for this purpose. The effects thereof are then superimposed on each other, in that the path of the laser beam will be deflected in sequence by means of the modulating mirror as well as by means of the adjusting mirror.

BRIEF DESCRIPTION OF THE DRAWING

Additional alternatives and modifications, as well as further features and advantages of the invention may now be more readily ascertained from the following detailed description of an exemplary embodiment thereof which is illustrated in a generally diagrammatic manner, having reference to the accompanying single FIGURE of drawing illustrating, in an elevational sectional representation, a laser for the treatment of a surface, which is constructed in a semi-portal or cantilevered structure.

DETAILED DESCRIPTION

The illustrated irradiating arrangement 11 for the treatment of the surface 12 of a workpiece 13 possesses a plurality of deflecting mirrors 14 (14.1, 14.2) which are interposed in the path of a beam 15 intermediate a laser source 16 and the workpiece 13. At least one of the deflecting mirrors 14 is equipped with a plurality of side by side mounted individual adjusting elements 17 (preferably in the structural configuration of piezo-actuators) for effectuating a localized change in the topography of its mirror surface 18, which adjusting elements 17 can be mounted and arranged in a manner as specifically disclosed and taught in the Multi-Dither-Actuator (MDA) mirror in British Laid-Open Patent Appln. 2,162,713, referred to hereinabove. This arrangement generates, through localized phase displacements, in effect, through a distortion of part regions of the wave front of the laser beam 19, a specific wave front and, as a consequence thereof, a specified focusing as well as geometry and intensity distribution of the beam focal point 20 on the surface 12 of the workpiece. For this purpose, the lengths of the individual adjusting elements 17 are set, and possibly varied over a period of time, by means of a control apparatus 21 in conformance with the measure of the set task from a reference value transmitter 22. When an actual value transmitter 23 is provided for the receipt of the momentary beam focal point 20 which is present on the surface 12 of the workpiece, which may be constructed as an infrared image receiver, then by means of the actual value feedback or reflection 24 there is formed a closed beam focal point-control circuit with respect to the tasks which are set from the reference value transmitter 22. The last-mentioned can be controlled by a guidance magnitude 25 which delivers information to a setting or adjusting arrangement 26 for the positional and timewise displacement of the workpiece 13 relative to the laser beam-treatment head 27.

For the functioning of the closed control circuit through intermediary of the reflection or feedback 24, the single, individually influencable cross-sectional areas of the beam 19, namely in their associations with the individual adjusting elements 17, must be individualized in order to achieve a beam 19' which is deformed in a defined manner over its cross-sectional surface area. The identification with regard to the individual beam segments, corresponding to the individual partial zones of the mirror surface 14, is effected through individually relatively high-frequencied vibration-modulations, which are superimposed to the, in contrast therewith, low-frequencied varying adjusting displacements of the individual adjusting or setting elements 17. In all instances, the displacements which are realizable by means of the, for instance, piezoactuators, are relatively limited; and the mechanical coupling which is effected over the mirror surface 18 between the individual adjusting elements 17 can lead to mixed vibration products or results, which exert an influence over the stable mode of operation of the control circuit. Consequently, it can be advisable not to undertake in a single one of the present deflecting mirrors 14 the characteristics-modulation and the adjusting displacement in the respective mirror region by means of a single adjusting element 17 in the way of an electrical signal superposition, but rather to undertake an optical superposition in such a mode whereby in one deflecting mirror 14.1 there is effectuated only the adjusting deformation of the surface 18.1, and in another deflecting mirror 14.2 during the same course of the beam path 15 the characteristics-modulation of the mutually adjacent surface portions of the mirror surface 18.2, as is considered in the drawing. The adjusting elements 17.2 in the modulation mirror 14.2 are connected to a modulation-frequency transmitter 28 and, as a result thereof, no longer mechanically or electrically coupled with the actuating for the deformation-adjusting elements 17.1, which is individually implemented from the control apparatus 21.

The modulation and adjusting mirrors 14.2, 14.2 are suitably arranged in the region of the two front ends surfaces 29 of a traverse 30 which supports the beam focusing head 27 at it open forwardly projecting end, so that they are readily accessible to flow of cooling media (not shown). The traverse 30 is retained by a support conduit or column 31 which, similar to the high-energy laser source 26, is stationarily arranged and co-axially supplied from the interior of the latter with the laser beam 19. In order to be able to adjust the laser beam head 27 in accordance with the measure of the treatment or processing demands relative to the coordinates of movement for the workpiece which is to be treated, the traverse 30 (as is indicated in the drawing through the double-headed arrows) is displaceable along the column or support conduit 31 and also rotatable thereabout and, moreover is equipped with a telescopable sliding-rotary guide 32, in order to be able to vary the distance and the orientation of the radiation from the laser beam head 27 relative to the support column or conduit 31. The geometry of the beam path 15 is thereby not influenced, inasmuch as the deflecting mirror 14 is fixed within the central axis of the path of the beam 15 during entry and exit from the traverse 30; in effect, within the intersecting points of the axes of the conduits and, as a result, the deflected path of the beam 15. When there is additionally required a displacement of the beam head 27 out of the parallel plane relative to the support conduit 31, this merely requires an additional angled run for the traverse 30 (transversely of the illustrated plane of the drawing), with further deflecting mirrors being arranged in the further deflecting points for the path of the beam 15.

What is claimed is:

1. An arrangement for the guidance of a beam during the treatment of workpieces with a laser, particularly during a surface treatment with a laser beam; comprising mirrors interposed in the path of the beam intermediate a laser source and the workpiece, said mirrors including at least one deflecting mirror equipped with adjusting elements for imparting a locally variable topography of the mirror surface thereof; and control apparatus controlling said adjusting elements for effectuating a deformation of the cross-sectional geometry of the laser beam in conformance with the measure of a specified geometry of a focal point of the beam on the surface of the workpiece.

2. An arrangement as claimed in claim 1, including an image receiver-actual value transmitter for effectuating a control circuit feedback to said control apparatus, and the individual cross-sectional regions of the deformed laser beam are imparted a higher-frequencied superimposed characteristics-modulation from a modulation-frequency transmitter.

3. An arrangement as claimed in claim 2, including a plurality of deflecting mirrors being sequentially interposed in the path of the beam intermediate said laser source an said workpiece for the actuation of the adjusting elements associated therewith from the control apparatus or, respectively, the modulation-frequency transmitter.

4. An arrangement as claimed in claim 1, including a hollow traverse for the path of said laser beam, deflecting mirrors being arranged at the ends of aid traverse, said mirrors being movable relative to a stationarily positioned high-energy laser source and relative to a stationary adjusting means for imparting movement to the workpiece, said deflecting mirrors constantly remaining within the longitudinal axis of the deflected path of the laser beam.

5. An arrangement as claimed in claim 1, wherein adjusting means imparts movement to the workpiece relative to a head on said arrangement for the exit of the laser beam of the arrangement, from which one guidance parameter is conducted to a reference-value transmitter for the beam forming-control apparatus.

* * * * *

UNITED STATES PATENT AND TRADEMARK OFFICE
CERTIFICATE OF CORRECTION

PATENT NO. : 5,101,091

DATED : March 31, 1992

INVENTOR(S) : Robert Grub, et al.

It is certified that error appears in the above-identified patent and that said Letters Patent is hereby corrected as shown below:

Column 2, line 34: after "already" insert --been--

Column 3, line 8: "crosssectional" should read as --cross-sectional--

Column 4, line 47: first instance of "14.2" should read as --14.1--

Column 4, line 50: "it" should read as --its--

Column 6, line 8, Claim 3: "an" should read as --and--

Column 6, line 15, Claim 4: "aid" should read as --said--

Signed and Sealed this

Ninth Day of November, 1993

Attest:

BRUCE LEHMAN

*Attesting Officer*  *Commissioner of Patents and Trademarks*